(12) United States Patent
Averianov et al.

(10) Patent No.: US 10,706,627 B2
(45) Date of Patent: Jul. 7, 2020

(54) METHOD OF CONTROLLING A DEVICE FOR GENERATING AN AUGMENTED REALITY ENVIRONMENT

(71) Applicant: DEVAR ENTERTAINMENT LIMITED, Nicosia (CY)

(72) Inventors: Vitalii Vitalievich Averianov, Tula (RU); Andrei Valerievich Komissarov, Tula (RU)

(73) Assignee: DEVAR ENTERTAINMENT LIMITED, Nicosia (CY)

( * ) Notice: Subject to any disclaimer, the term of this patent is extended or adjusted under 35 U.S.C. 154(b) by 0 days.

(21) Appl. No.: 15/773,274

(22) PCT Filed: Nov. 27, 2016

(86) PCT No.: PCT/RU2016/050075
§ 371 (c)(1),
(2) Date: May 3, 2018

(87) PCT Pub. No.: WO2017/095273
PCT Pub. Date: Jun. 8, 2017

(65) Prior Publication Data
US 2018/0322703 A1    Nov. 8, 2018

(30) Foreign Application Priority Data
Dec. 2, 2015   (RU) ................. 2015151481

(51) Int. Cl.
*G06T 19/00*    (2011.01)
*G06K 9/28*    (2006.01)
(Continued)

(52) U.S. Cl.
CPC .......... *G06T 19/006* (2013.01); *G06K 7/1417* (2013.01); *G06K 9/00671* (2013.01);
(Continued)

(58) Field of Classification Search
CPC ................................... G06T 19/006
(Continued)

(56) References Cited

U.S. PATENT DOCUMENTS

2005/0187785 A1   8/2005 McIntyre et al.
2010/0284607 A1  11/2010 Van Den Hengel et al.
(Continued)

FOREIGN PATENT DOCUMENTS

RU          2295772 C1    3/2007

*Primary Examiner* — Shivang I Patel
(74) *Attorney, Agent, or Firm* — Nadya Reingand; Yan Hankin

(57) ABSTRACT

The invention relates to processing and generating image data and analysis and displaying a 3D image. A method of controlling a device for generating an augmented reality consists in receiving object-related data from sensors, recognizing the object and generating a virtual object, the authenticity of an activation code that identifies a set of pictures containing objects is pre-verified, data related to an object obtained in the form of photo or video frame(s), the object is identified on said frame(s) by comparison with images stored in the memory of the user device, and a virtual object is generated in the form of a 3D model, reproduced in real time, on a display of the user device, on top of the acquired frames. Wherein the object is a two-dimensional image of at least one item depicted on a picture contained in a set to which an activation code is assigned.

10 Claims, 3 Drawing Sheets

(51) Int. Cl.
*G06K 9/00* (2006.01)
*G06K 7/14* (2006.01)
*G06K 19/06* (2006.01)
*G06T 19/20* (2011.01)
*G06F 3/14* (2006.01)
*G06K 9/62* (2006.01)

(52) U.S. Cl.
CPC ......... *G06K 9/28* (2013.01); *G06K 19/06037* (2013.01); *G06T 19/20* (2013.01); *G06F 3/14* (2013.01); *G06K 9/6201* (2013.01); *G06T 2219/2012* (2013.01)

(58) Field of Classification Search
USPC .......................................................... 345/419
See application file for complete search history.

(56) References Cited

U.S. PATENT DOCUMENTS

2012/0320052 A1\* 12/2012 Givon .................. G06K 9/3216
345/420
2018/0158060 A1\* 6/2018 Adams ................ G06Q 20/409

\* cited by examiner

METHOD OF CONTROLLING A DEVICE FOR GENERATING AN AUGMENTED REALITY ENVIRONMENT

CROSS-REFERENCE TO RELATED APPLICATIONS

The present patent application is a National Stage application of the PCT application PCT/RU2016/050075 filed Nov. 27, 2016 which claims priority to Russian patent application RU2015151481 filed Dec. 2, 2015.

FIELD OF INVENTION

The invention relates to processing and generation of image data, image analysis, including texture and 3D image visualization.

BACKGROUND

The closest in technical substance prototype is a computer-implemented method, comprising: using a user device receiving sensory data for a physical object located in close proximity to a user, said data generated by sensors associated with a user device; recognizing the object; generating a virtual object having a predetermined relationship with a physical object in response to the object recognition; and transmitting the virtual object to the display associated with the user device for presentation to the user in accordance with the aforementioned predetermined relationship (see RU 2013154098 A, cl. G06F 15/16).

A known method can be used to create a virtual object related to a real physical object.

The disadvantage of the known method is lack of ability to create an augmented reality environment with respect to remote objects due to the use of the sensors to obtain data thereby only detecting effects on the sensor.

Another disadvantage of the known method is lack of ability to provide high reliability of recognition of the objects that are similar in their characteristics due to the lack of additional data about the object in addition to the data generated by the sensor.

Another drawback of the known solution is that it does not disclose details of the formation of a virtual object. From the indication that the virtual object is being transmitted to the display associated with the user device, it can be concluded that the virtual object is generated remotely, which means high requirements for communication with the remote generation means in terms of communication speed for transferring large amounts of data.

In addition, the use of the known method does not provide a capability to differentiate access to content depending on user's qualities, for example, according to professional or age criteria.

SUMMARY

The technical objective addressed herein is to provide a capability to create an augmented reality environment with respect to physical objects, including, remote objects using photo or video images of the physical object, while increasing the reliability of recognition of objects that are similar by their characteristics by using a unique activation codes associated with specific objects, simplifying the implementation by reducing requirements for communication means, as well as providing a capability to restrict user access to the formation of augmented reality environment by a certain criterion.

The above result is achieved by the method of forming an augmented reality environment using a user device consisting in obtaining data associated with an object from sensors of the user device, recognizing the object and generating a virtual object, authenticating an activation code identifying a set of pictures containing a plurality of objects, obtaining data associated with the object in the form of at least one photo or video image frame containing the object, the object recognition is performed on the photo or video frame by comparing with images stored in the memory of the user device, generating a virtual object as a 3D model displayed in real time at the screen of the user device over the frames of the received photo or video image, wherein the object in relation to which the 3D model is formed, is a two-dimensional image of at least one object depicted in a combined set of pictures, which was associated to the activation code.

In addition:
the activation code can be a code word containing a sequence of letters and/or digits;
the activation code can be a two-dimensional image made with the possibility of scanning it with a photo or video camera;
if there is more than one frame of the received photo or video image, they are selected from them in terms of the acceptable image quality;
3D model context-related to the object is formed in response to its recognition;
3D model is formed in color, while forming a matrix of transformation of the image coordinates into its own, namely Cartesian coordinates characterized by the orthogonality of the axes, elements of the 3D model are painted in colors of the corresponding elements of the photo image by forming the texture of the scanned image area using the coordinate transformation matrix and interpolation of data with the subsequent assignment of the texture to the 3D model in such a way that the corresponding polygons are covered by the corresponding sections of the texture in accordance to the texturing coordinates determined in the prior steps;
3D model is formed in color, while forming a matrix of transformation of the image coordinates into its own, namely Cartesian coordinates characterized by the orthogonality of the axes, color the elements of the 3D model in the colors of the corresponding photo elements by determining the colors of the materials of the 3D model based on the color reading, in preset points of the photo image using the coordinate transformation matrix, and then assigning colors to the corresponding materials of the 3D model;
3D model is formed in color, while forming a matrix of transformation of the image coordinates into its own, namely Cartesian coordinates characterized by the orthogonality of the axes, color the elements of the 3D model in the colors of the corresponding photo elements by creating a texture consisting of photo sections, filled with solid colors taken at predetermined points of the photo image using the coordinate transformation matrix;
previously known areas on the texture created for the 3D model are painted by filling with colors of adjacent pixels to remove the outlines of the object to be painted on the resulting image;
a map of shadows is also applied to the texture created for the 3D model.

BRIEF DESCRIPTION OF THE DRAWINGS

The method for forming augmented reality environment using a user device is explained using the drawings, wherein.

Figure 1:
FIG. 1 shows an example of the formation of augmented reality environment using a user device.

The following designations are made in the drawings:

1—a picture from a set of pictures, 2—an object in relation to which an augmented reality environment is created, 3—a user device (mobile device), 4—a camcorder or a camera, 5—a display, 6—input means, 7—means of communication with the server, 8—means for recognizing the activation code, 9—means for authenticating the activation code, 10—means for recognizing the object, 11—means for generating the 3D model, 12—memory means, 13—sound output means, 14—means for generating signals of the final image, 15—obtaining the activation code data, 16—preliminary approval of the activation code, 17—transmission of the activation code to the server and receipt of the authentication results, 18—evaluation of the results of the authentication of the activation code on the server, 19—launching formation of augmented reality environment, 20—receiving image signals from the output of a photo or video camera, 21—recognizing the object on the image, 22—generating the final image signal for display, 23—server comprising activation code verification means, 24—Internet, 25—means of calculating the user device.

DETAILED DESCRIPTION OF THE PREFERRED EMBODIMENT

The method for controlling device adapted to form augmented reality environment provides formation of augmented reality environment using a user device and an activation server, the method comprises the following steps: The object in relation to which the augmented reality environment is created is a two-dimensional image of at least one object represented by the picture (FIG. 1). Pictures are combined into a set consisting of several pictures, provided with an activation code, which is either a code word containing a sequence of letters and/or numbers, or a two-dimensional image that can be scanned with a photo or video camera. The authenticity of the activation code is verified, said code identifying a set of pictures containing objects to be displayed as a 3D model. In the case of a successful verification result, the activation code starts the process of rendering of a 3D spatial model, during which at least one photo or video image frame of the object is acquired by means of a camera or video camera of the user device. Based on the reference images stored in the memory of the user device comprising augmented reality forming means, the object is recognized on the frame, and then a 3D model is formed having a semantic connection to the object, its image reproduced in real time by display means over the frames of the received photo or video image. In this case, at least one frame of a photo or video image of the object is acquired, wherein if more than one frame of the photo or video image is acquired, a frame is selected based upon picture quality.

A 3D model is formed in color, with the coloring being performed in one of three approached. The first coloring approach comprises forming a transformation matrix to transform coordinates of the photo image into its own, namely the Cartesian coordinates characterized by the orthogonality of the axes, and color elements of the 3D model into the colors of the corresponding photo image elements by forming the texture of the image by reading area using the coordinate transformation matrix and interpolating the data with subsequent assignment to the 3D texture model, so that the corresponding polygons are covered by the corresponding sections of texture by preforming texture coordinates at stage of texturizing.

The second coloring approach comprises forming a transformation matrix for transforming coordinates of the photo image into its own, namely the Cartesian coordinates characterized by the orthogonality of the axes, coloring elements of the 3D model in the colors of the corresponding photo elements by determining the colors of the 3D model materials based on the color reading at predetermined points of the photo image using the coordinate transformation matrix, and then assigning colors to the corresponding materials of the 3D model.

The third coloring approach comprises forming a matrix for converting the coordinates of the photo image into its own, namely the Cartesian coordinates characterized by the orthogonality of the axes, coloring elements of the 3D model in the colors of the corresponding photo elements by creating a texture consisting of photo sections, solid colors taken at predetermined points of the photo image, using the coordinate transformation matrix.

On the texture generated for the 3D model painting predetermined areas by filling with colors of adjacent pixels to remove the outlines of the object being painted on the resulting image, and also applying an ambient occlusion map to the created texture for the 3D model.

The method for forming an augmented reality environment using a user device is used as follows.

The augmented reality effect is created using a user device that is a mobile device comprising a built-in photo or video camera, computing means, memory means, input and display means for displaying images, and also using a server hardware providing an appropriate interface to the user device. The mobile device is configured to exchange signals with the server using the Internet and is provided with an appropriate wireless communication means.

The objects in relation to which the effect of the augmented reality is formed are two-dimensional images, generally a set of pictures. A spatial 3D model is created for each such picture. Said 3D model can be shown on the display in a form of static image or video sequence, for example, an animated image.

A certain number of pictures, for example in the amount of 20, are combined into a set to which an activation code is associated. The activation code is a codeword or other two-dimensional image that can be scanned with the built-in photo or video camera, printed on a special area, for example on the cover, so that it remains hidden until the set of pictures is opened.

A codeword is an alphanumeric sequence containing letters and/or numbers made by one of known fonts.

Activation codes are generated in advance in the batch mode: at least 1000 units in the packet. During formation of batches, activation codes are checked for uniqueness in relation to previously generated activation codes. Formed batches are stored on the activation server, which provides an interface for working with activation codes.

Thus, the activation code corresponds to a specific set of objects, and its uniqueness makes it possible to use it as an additional feature that delimits sets of objects that are close in their parameters, for example, it allows separating images of the same type of cars by their brands.

The process of managing the augmented reality means primarily involves authenticating the activation code corresponding to the set of pictures used, using the interface implemented on the activation server. For this purpose, using information input means a codeword is entered into the corresponding field of one of the initial pages of the mobile management program, or an activation code image is read using a video or camera built into the user device, then recognizing its constituent symbols and after a preliminary check by the computing means the user device, it is sent to the server to obtain permission to activate the process of forming the augmented reality environment. In the case of a positive result of the test, the server generates an activation command for the process of forming the augmented reality environment and transmits it to the user device.

The user device control program activated this way generates a signal processing command coming from the output of the photo or video camera, by which the image of the object is captured by pointing said photo or video camera of the user device to one of the pictures in the set. At least one frame is obtained with an image of the corresponding figure, on which, by means of the computing means, an object corresponding to the picture is recognized.

Recognition performed using pre-created images stored in the memory of the calculation tools.

The signals from the photo or video camera output are applied to the input means of the display to show the captured image.

If there is more than one frame of the received photo or video image, selection is made based upon image quality.

Next, using the user device computing means, a 3D model corresponding to the recognized object is formed.

An image of the 3D model is rendered in color, while the elements are colored in any acceptable way, including the following options. Initial data for coloring is the following:
  a model consisting of groups of polygons, wherein materials are assigned to said groups,
  one or two unwrap (texture coordinates),
  a marker image,
  additional maps of illumination, relief, etc.

The first approach comprises forming a matrix for converting the coordinates of the photo image into its own, namely Cartesian coordinates characterized by the orthogonality of the axes, coloring the 3D model polygons (elements) in the colors of the corresponding photo or video elements by forming the texture of the image reading area using the coordinate transformation matrix and interpolating the data with the subsequent assignment of the texture of the 3D model, such that the corresponding polygons are covered by the corresponding sections of the texture pre-formed at the texturizing step, Hereinafter, a "Material" is assigned to a group of model polygons and has a number of settings. The color can be set either simply by specifying the color or by assigning a texture (picture+coordinates of its sweep along the model). "Texture" is any digital image that is used/planned to be used as a "color" of the 3D model. "Coordinates of the texture"—data that maps the 3D model polygons to the areas of the texture. One section of texture can correspond to several polygons. Another name for the coordinates of the texture is a scan or wrap/unwrap.

Thus, the coloring of the first approach comprises: obtaining an image frame, restoring the "orthogonal" marker image using the marker coordinates supplied by the recognition means, superimposing it on the model as a texture using a pre-made orthogonal unwrap.

The second approach comprises forming a transformation matrix for converting the coordinates of the photo image into its own, namely the Cartesian coordinates characterized by the orthogonality of the axes, coloring the polygons of the 3D model into the colors of the corresponding photo elements by determining the colors of the 3D model materials based on color reading, at predetermined image points using the coordinate transformation matrix, and then assigning colors to the corresponding 3D model materials.

Thus, the second coloring approach comprises: obtaining an image frame, reading the color at the given points in the frame, using the marker coordinates supplied by the recognition means, then applying it to the model as a texture using a pre-made orthogonal scan, the model materials are assigned these colors. A point on the marker is pre-aligned with certain model area.

Alternatively, a new texture is generated based on pre-created masks. Masks of the corresponding colors are superimposed on the new texture in the given order, forming an image in the "normal" unwrap, and further on the resulting texture additional maps of illumination/shadows etc. are applied.

The third approach comprises forming a transformation matrix for converting the coordinates of the photo image into its own, namely the Cartesian coordinates characterized by the orthogonality of the axes, coloring the elements of the 3D model into the colors of the corresponding photo elements by creating a texture consisting of photo segments, at predetermined points of the photo image, using the coordinate transformation matrix.

Thus, the coloring of the third approach comprises: obtaining an image frame, restoring the "orthogonal" marker image using the marker coordinates supplied by the recognition means, generating a new texture in the "normal" unwrap using element-by-element transfer of the entire image from the marker. The transfer occurs by relating the two unwrap coordinates—conventional and planar. Each polygon of the model is present on both unwraps, thereby associating these areas, and then, if necessary, additional light/shadow maps, etc., are applied over the resulting texture.

In either approach additionally an "erasure" of marker lines can be used by replacing colors of certain pixels with the colors of neighboring pixels. Namely, for removing the contours of the object to be painted on the 3D texture model created, the pre-established areas are colored with colors of the adjacent pixels.

Additional texture elements are also applied to the texture created for the 3D model, in particular an ambient occlusion map is applied.

Next, the final image signals are generated wherein the 3D model image is superimposed on the image from the output of the photo or video camera and fed to display input, so that the 3D model image is reproduced over the real-time image, captured photo or video camera.

The method for forming an augmented reality environment using a user device is implemented using a photo or video camera, which makes it possible to form an augmented reality environment with respect to any object in the field of view of the object, both close and remote.

The method for forming an augmented reality environment with using a user device presupposes a preliminary activation of the process, the activation code can be used as a detailed set of figures containing objects, facilitating the selection from the memory of images of only a certain category for object recognition, which increases the reliability of correct recognition of objects.

The server involved in the implementation of the method is used to verify the validity of the activation code, so the communication channel with the server does not require the use of powerful and high-speed communication facilities, which simplifies the hardware implementation of the method.

In addition, due to the validation of the activation code, the method of forming the augmented reality environment using the user device allows it to be restricted to users who do not have access to the method. The criteria for such a restriction can be, for example, the age of the user, thereby restricting the content provided by the implementation to such a user. Another example of the restriction criteria may be a professional status of the user affecting the degree of access to confidential information allowed to him. Restrictions may be determined by other criteria.

Figure 2:
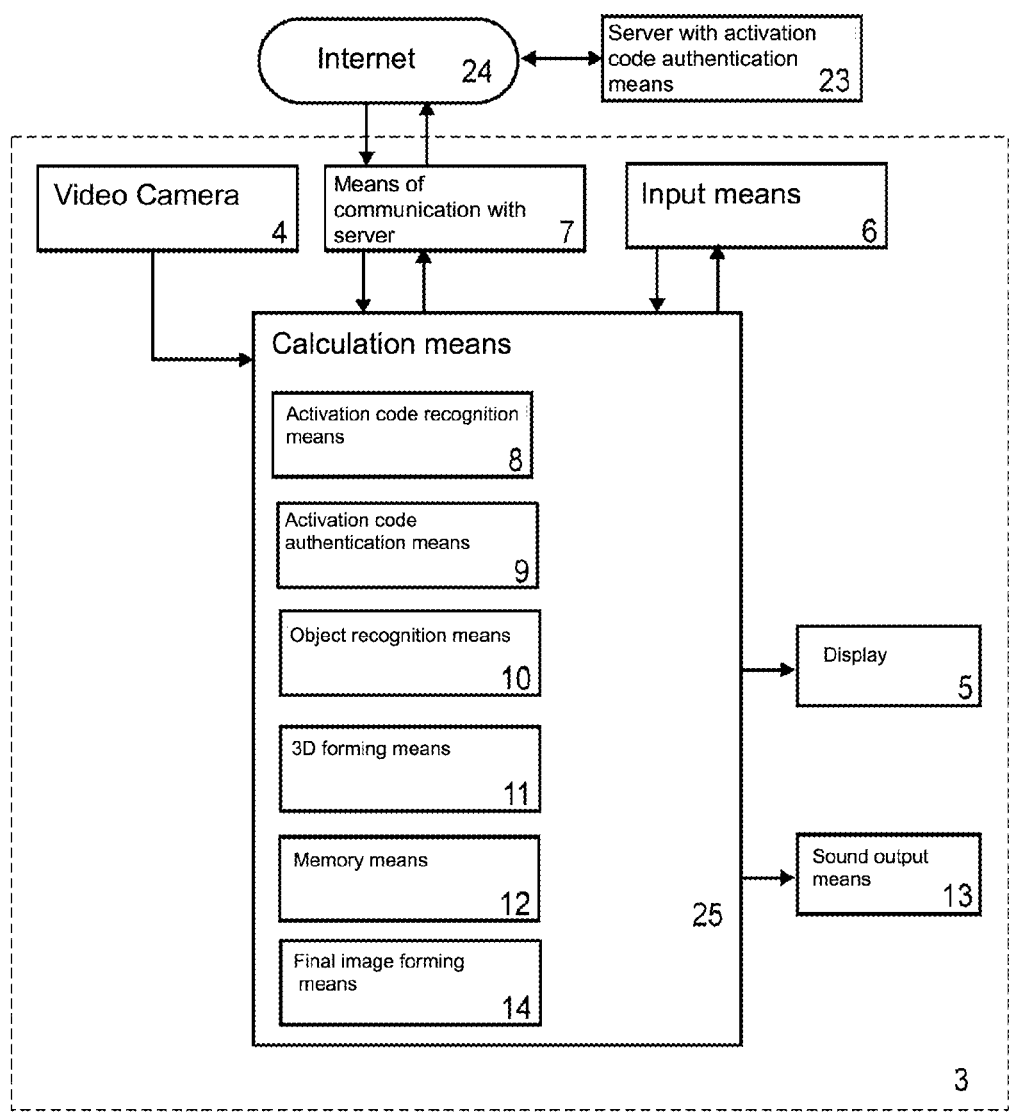
FIG. 2 is a block diagram of the augmented reality environment forming device, FIG. 3—algorithm for controlling the processor of the user device computing means.

The device adapted to form augmented reality (FIG. 2) comprises a user device, preferably a mobile device comprising computing means connected to the inputs/outputs of memory means, a photo or video camera, a display, information input means, audio output means and means for communication with the server, which is a wireless data transfer node, within the framework of Wi-Fi standards or GPRS standards, or LTE, or the like, for communication with the server, and an activation server equipped with validation means to check validity of the activation code, memory means for storing the activation codes and connected with the user device via the Internet. The computing means comprise means for recognizing the activation code, means for checking the activation code, object recognition means, means for forming a 3D model, memory means, and means for generating signals of the resulting image.

Figure 3:
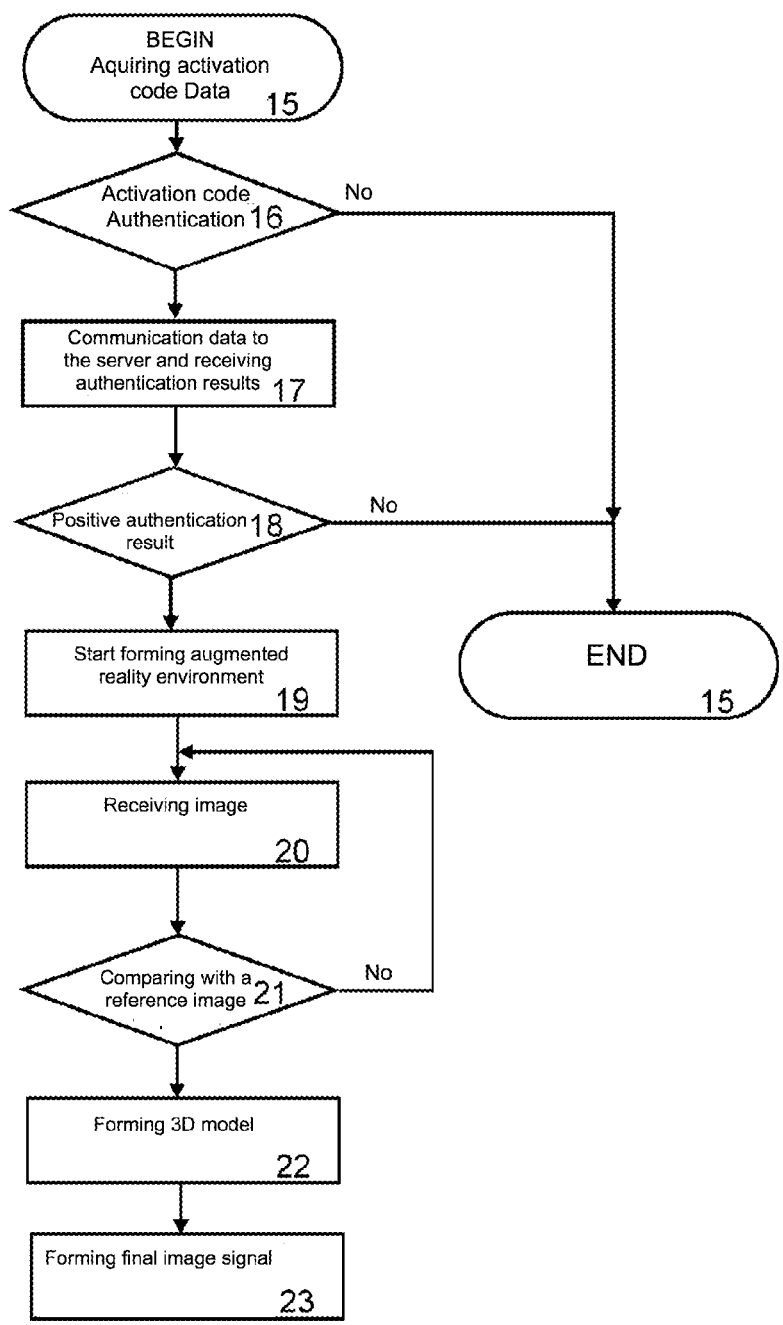

The computing means assume the following operating procedure (FIG. 3).

At the beginning, the activation code data is obtained, which is manually entered by the user using input means or by pointing the photo or video camera to its image. Input tools can be control buttons, buttons of the touch keyboard, a voice input node or a photo or video camera.

The activation code is then verified according to the formal characteristics by comparing the length, and/or parity, and/or allowable symbols, etc., with valid values.

After the local check, the activation code data is transmitted by the communication means to the server. The server checks the validity of the code by comparing it with the codes stored in its memory.

After receiving the verification results from the server, the server command is used to activate or unlock the process of managing the formation of the augmented reality environment. If the test results are negative, then the process ends.

If the results of the test are positive, then the process of forming the augmented reality environment is started.

An image is obtained from the output of a photo or video camera pointed by the user to the picture comprising the object.

The computation means access the memory to locate and recognize an object on the captured image by comparing it with stored object images.

Once the object is recognized, a 3D model is created that is associated with the recognized object.

At the final stage of the formation of the augmented reality environment, the output of the final image signals is generated.

The described embodiments of the present invention and the arrangement of components, numerical expressions and numerical values set forth in these embodiments do not limit the scope of this invention unless specifically indicated.

EXAMPLE

The augmented reality forming means comprise a user device, which comprises a mobile communication device equipped with a built-in video camera, computing means, memory means, input means in the form of touch buttons, an integrated display and communication means for communication with the server via the Internet, and also the activation server itself.

The objects in relation to which the augmented reality is being formed are pictures printed on sheets of paper collected in a pre-sealed album, on the inside of the cover of which a code word is printed.

The user, by unsealing the album, accesses the codeword of said album. By launching the corresponding application in the mobile communication device, the user enters in the corresponding field of the application the codeword, which in the form of signals is fed to the input of the computing means, wherein the formal characteristics are checked and then the codeword is transmitted to the server by means of communication to verify compliance with one of the stored on the server codewords. The server computing means checks the user-entered codeword for authenticity using the interface implemented on the activation server.

In the case of a negative test result, the work of the augmented reality creation media ends and the corresponding application remains locked.

With a positive result of the server check, a signal is generated to allow the user device to create an augmented reality environment that is transmitted via the Internet to the mobile communication means and thus unlocks the corresponding application.

Having obtained the ability to form the effect of augmented reality, the user directs the video camera of the mobile communication device to one of the album pictures, enabling the camera to capture the image of the object, as well as its detection and recognition by the computing means. In this case, the computing means access the memory of the mobile device, wherein the images of the objects contained in the album are stored. With respect to the recognized object, a spatial model is formed and displayed as a corresponding video sequence on the display over the captured image.

The audio output means is used to reproduce sound effects associated with the reproduced image of the 3D model.

The method for generating augmented reality environment using a user device can be implemented using standard components and an electronic component base including independent modules such as a camera, display, processor, etc.

Accordingly, the method of forming an augmented reality environment using a user device allows to create an augmented reality environment with respect to objects, including remote objects, by using a photo or video image of a physical object, provides increased reliability of recognition of objects close in their characteristics by using a unique activation code associated with specific objects, simplifies implementation by reducing the requirements for communications, and provides the ability to restrict access to the formation of an augmented reality environment for certain users.

What is claimed is:

1. A method for generating an augmented reality environment using a user device, comprising:

acquiring an activation code for identifying a set of pictures containing objects, communicating said activation code to a server for authentication, if the activation code is authenticated on the server, generating an activation command for forming the augmented reality environment and transmitting said activation code to the user device, in response to the activation code, acquiring data associated with an object from user device sensors, said data associated with the object being acquired in a form of at least one photo or video image frame of the object, recognizing the object, wherein object recognition is performed on the photo or video image frame by comparing and matching with images of the object stored in a memory of the user device, generating a virtual object as a 3D model, reproducing an image of said 3D model, in real time by display means of the user device, over the at least one acquired photo or video image frame of the object, wherein the object, in relation to the 3D model, is a two-dimensional image of at least one object represented in the set of pictures associated with the activation code.

2. The method of claim 1, wherein the activation code is a code word containing a sequence of letters and digits.

3. The method of claim 1, wherein the activation code is a two-dimensional image that can be scanned using a photo or video camera.

4. The method of claim 1, wherein in the presence of more than one acquired photo or video image frame, a selection is made based upon acceptable image quality.

5. The method of claim 1, wherein the 3D model generated in response to the object recognition is context related to said object.

6. The method of claim 1, wherein the 3D model is formed in color, the method further comprising:

forming a transformation matrix of image coordinates into its own, namely Cartesian coordinates, characterized by an orthogonality of axes, coloring polygons of the 3D model such that colors of the 3D model polygons correspond with colors of corresponding photo elements by forming a texture of a scanned area by using the transformation matrix and interpolation of data with a subsequent assignment texture to the 3D model, such that the corresponding polygons are covered by the corresponding textures based upon coordinates preformed at a texturizing stage.

7. The method of claim 1, wherein the 3D model is formed in color, further comprising:

forming a transformation matrix of image coordinates into its own, namely Cartesian coordinates, characterized by an orthogonality of axes, coloring polygons of the 3D model in such a way that colors of the 3D model polygons correspond with colors of corresponding photo elements by determining colors of materials of the 3D model based on a color reading at predetermined points of the acquired photo or video image frame using the coordinate transformation matrix, and assigning colors to corresponding materials of the 3D model.

8. The method of claim 1, wherein the 3D model is formed in color, further comprising:

forming a transformation matrix of image coordinates into its own, namely Cartesian coordinates, characterized by an orthogonality of axes, coloring polygons of the 3D model such that colors of the 3D model polygons correspond with colors of corresponding photo elements by creating a texture, said texture comprising areas of the acquired photo or video image frame, said texture also comprising areas filled with solid colors taken at predefined points of the acquired photo or video image frame, using the coordinate transformation matrix.

9. The method of claim 8, wherein, while the texture is created for the 3D model, predetermined regions are painted by filling adjacent pixels with colors to remove contours of an object being painted in a resulting painting.

10. The method of claim 8, wherein a map of shadows is applied to the texture created for the 3D model.

* * * * *